July 10, 1962    J. SOBCHAK    3,044,047
MEANS TO PREVENT ZERO TORQUE ERROR IN A SYNCHRO RECEIVER
Filed Dec. 15, 1958    2 Sheets-Sheet 1

INVENTOR.
JOHN SOBCHAK
BY Herbert L. Davis
ATTORNEY

July 10, 1962 J. SOBCHAK 3,044,047
MEANS TO PREVENT ZERO TORQUE ERROR IN A SYNCHRO RECEIVER
Filed Dec. 15, 1958 2 Sheets-Sheet 2

INVENTOR.
JOHN SOBCHAK
BY Herbert L. Davis
ATTORNEY

United States Patent Office 3,044,047
Patented July 10, 1962

3,044,047
MEANS TO PREVENT ZERO TORQUE ERROR IN A SYNCHRO RECEIVER
John Sobchak, Paramus, N.J., assignor to The Bendix Corporation, a corporation of Delaware
Filed Dec. 15, 1958, Ser. No. 780,502
3 Claims. (Cl. 340—198)

The invention relates to improvements in a synchro receiver of a type designed for use in a drum indicator system such as disclosed and claimed in copending U.S. application Serial No. 389,390, filed October 30, 1953, by Milton Brown and assigned to Bendix Aviation Corporation.

More particularly the invention is directed to the solution of a problem of instability in the control of such synchro receiver due to zero torque error in the receiver synchro when in an electromagnetically balanced position relative to that of a synchro transmitter.

A synchro transmitter when electrically connected to a synchro receiver provides zero torque at the synchro receiver, when the two synchros are at the synchronous position. The torque in the receiver goes up as the displacement increases until it reaches a maximum at 90°, then decreases to 180° and is zero at 180°. However, at 180° the system is unstable and usually a small error will cause the receiver to "snap" into position 180° away.

When the transmitter is coupled to a device that measures in an analogue fashion all angles, the chance of the transmitter and the indicator being displaced 180° when power is turned on is remote and usually in a short time the angle will change sufficiently to cause the indicator to snap into the correct position.

However, when the transmitter is driven by a device such as a counter or computer as in the case of the hundreds drum of the indicator system of the aforenoted application the transmitter will be in a finite number of discrete positions and the possibility of the transmitter and the receiver being out exactly 180° when power is turned on is very probable. In this type of system it will usually be a relatively long time before the transmitter is rotated to a new step, therefore, there can be an error for a long time.

An object of the invention is to provide novel means to avoid the error introduced at the zero torque position of such a synchro receiver.

Another object of the invention is to provide a counterweight on the indicator of a synchro receiver arranged in such a manner that the indicator will always be displaced from a position corresponding to that of the synchro transmitter, so as to avoid a zero torque position and in which arrangement the indicator is so calibrated as to correct for the error introduced by the counterweight.

Another object of the invention is to provide a novel synchro receiver indicator arrangement in which there is mounted on a rotary indicator of the synchro receiver a counterweight so positioned relative to the rotary indicator as to bias the synchro receiver to a predetermined displaced position relative to that of the synchro transmitter when the rotors of the synchro receiver and transmitter are in an electromagnetically balanced relation. The foregoing arrangement is such as to effectively avoid the positioning of the rotary indicator of the synchro receiver to a zero torque position in following the position of the rotor element of the synchro transmitter by causing the transmitter synchro to continuously apply an error voltage and torque to the receiver synchro to overcome an opposing torque applied by the counterweight to the rotary indicator when in the electromagnetically balanced relation and furthermore the rotary indicator is so arranged and calibrated as to correct for the predetermined error introduced by the counterweight.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Referring now to the drawings for a more detailed showing of a novel distance indicating system embodying the invention:

Figure 1:
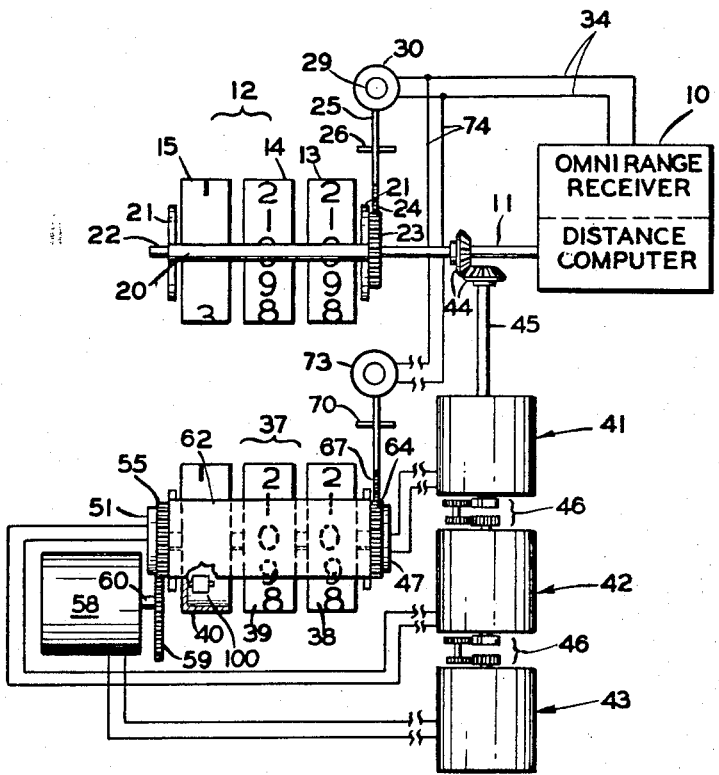
FIGURE 1 is a schematic diagram of a distance indicating system, including a main drum counter indicator, a similar remote indicator, and an arrangement for actuating the latter indicator together with a counterweight on the hundreds drum.

Referring first to FIGURE 1, the invention is illustrated in its application to an automatic distance indicating system of established type widely used on aircraft, which receives beacon signals from an omnirange transmitter, automatically computes the distance to the transmitter and operates a drum counter indicator to show at all times the distance in miles between the aircraft and the transmitter.

This arrangement includes a receiver and distance computer 10, which operates through shaft 11 a standard type of drum counter 12. The receiver and computer are so well known that they are shown only diagrammatically and may be of a type disclosed and claimed in the U.S. application Serial No. 389,390. The indicator 12 has the usual units drum 13, tens drum 14 and hundreds drum 15, with interposed Geneva movement drive of standard type, not shown, so that the tens drum 14 will shift 1/10 of a revolution for each revolution of the units drum 13 and the hundreds drum 15 will shift 1/4 of a revolution for each revolution of the tens drum 14.

A signal is provided on the main indicator 12 for warning the observer when power failure, or the weakness or lack of signals picked up by receiver 10, prevents said receiver from operating properly the indicator 12, in which case the mileage shown thereon would be an unreliable indication of the distance to the transmitter. In the form illustrated, this warning signal comprises a metal strip 20 with inturned end portions 21 pivoted on the shaft 22 of the indicator 12. The strip 20 is located just above the drum surface, and may be swung into or out of position in line with the visible numerals on the drums, being advantageously painted a bright color to attract attention. In the form illustrated the signal strip 20 is narrow and permits observation of the numerals at all times.

Means actuated by the power in the receiver 10 is provided for swinging signal 20 into and out of operative position. In the form illustrated in FIGURE 1, a pinion 23 fixed to a signal strip end portion 21 meshes with a gear sector 24 on a lever arm 25 mounted on pivot 26 carried by the mounting plate, arm 25 having an end pivoted to an extension of an arm attached to the plunger 29 of solenoid 30. A spiral spring is arranged to swing the lever arm 25 normally into position where the signal strip 20 overlies the visible numerals on the indicator 12.

When solenoid 30 is energized it retracts plunger 29 against the pressure of the spring, swinging the signal strip 20 laterally out of view through a suitable window. The solenoid energizing circuit 34 (FIGURE 1) extends to the receiver 10, and is connected in series with the signal circuit therein, so that if the signal becomes too weak to operate indicator 12 properly, or is missing, or if the power should fail and prevent any signal output, solenoid 30 would be deenergized, permitting the spring to shift signal 20 into operative position. Moreover, the signal will retain such position after the receiver 10 is initially turned on until the receiver has heated up and is operating with enough power to position indicator 12 properly, so that premature reading of the indicator is prevented.

It is generally important to provide a plurality of auxiliary indicators, located at various points distant from the main indicator 12 and which will at all times have the same reading, a system that is necessary in larger aircraft, for instance. An improved arrangement for operating remote indicators of this type is disclosed and claimed in the copending U.S. application Serial No. 389,390 and referring again to FIGURE 1, a remote drum type indicator 37 is provided with a units drum 38, a tens drum 39, and a hundreds drum 40 corresponding to drums 13, 14 and 15 of the main indicator 12.

As a standard type of drum counter is generally used for the indicator 37, a servo having sufficient power to drive the indicator would be required, together with a servo operating circuit which would include an amplifier to furnish the necessary operating energy. This is avoided by providing at the main indicator 12 a remote indicator drive including an electrical actuating element for each of the drums of the remote indicator 37, and at the remote indicator 37 a separate drive for each of said drums operated by one of said elements.

The actuating elements 41, 42 and 43 are driven from shaft 11, as by bevel gears 44 and shaft 45. These elements may be synchros connected through step drive gearing 46, which may be of the mutilated gear type rotating in unison with the general drive of the drums of the main indicator 12, so that the rotor of the tens synchro 42 will shift 1/10 of a revolution for each revolution of units synchro 41 attached to shaft 45, and the rotor of synchro 43 will move 1/10 of a revolution for each revolution of the tens synchro 42. Obviously other well known drive arrangements may be employed.

The drums 38, 39 and 40 of remote indicator 37 are independently mounted, and each is connected to and rotated by a drive element electrically actuated by the corresponding synchro 41, 42 or 43. In the form illustrated, as disclosed in detail and claimed in the copending application Serial No. 389,390, there is provided a units drive synchro 47 mounted in the frame of the remote indicator 37, coaxial with an extending into the units drum 38 and having a transverse flange mounted on the shaft of the rotor of synchro 47, said flange advantageously being deflected axially so that it lies close to the longitudinal center of the indicator 37. The tens drive synchro 51 is similarly mounted on the frame of the indicator 37 extending axially into the frame; and a central flange of the tens drum 39 is bent to lie in about the longitudinal center of the indicator 37 and is mounted on the rotor shaft of synchro 51.

The hundreds drum 40 has a centrally apertured end flange rotatably mounted in the frame of the indicator 37. In the form disclosed and claimed in the copending application Serial No. 389,390 there is provided a flat ring gear 55 fixed to a flange and to a cylinder rotatably fitted around a cylindrical bearing in the frame of the indicator 37. A suitable hundreds drum drive element engaging ring gear 55 is provided and in the arrangement as illustrated in FIGURE 1 and described in the copending application Serial No. 389,390, this element comprises a synchro 58 mounted on the frame of the indicator 37 and having a pinion 59 on its rotor shaft 60 engaging ring gear 55.

In the embodiment of the aforenoted copending application the units drive synchro 47, actuated by units transmitter synchro 41, is to rotate the remote indicator units drum 38 in synchronism with the main indicator units drum 13; the tens drive synchro 51, actuated by tens transmitter synchro 42, is to rotate the remote indicator tens drum 39 in synchronism with main indicator tens drum 14, and the hundreds drive synchro 58, actuated by hundreds transmitter synchro 43, is to rotate the remote indicator hundreds drum 40 in synchronism with the main indicator hundreds drum 15. In this manner movements of the main indicator drive shaft 11 are to operate the remote indicator 37.

A warning signal is likewise provided for the remote indicator 37, and operates in the same manner as the signal on the main indicator. It comprises a signal structure including a strip 62 with an inturned end on which is mounted ring gear 64 fixed to a cylinder rotatably supported by cylindrical bearings on the frame of the indicator 37. As described in the copending application Serial No. 389,390, a gear sector 67 meshing with ring gear 64 is mounted on a lever arm fixed to a pivot block rocking on pivot 70 on the frame of the indicator 37, and fixed at its other end to a rocking arm engaging a plunger of solenoid 73, whose winding is connected in parallel with the winding of the main indicator solenoid 30 through leads 74 (FIGURE 1).

A tension spring normally biases the gear sector 67 into a position where the signal strip 62 overlies the numerals on the drums of indicator 37, except when solenoid 73 is energized and rocks the gear sector 67 to shift signal 62 into invisible position. In the form illustrated in FIGURE 1 the strip 62 is wider than the strip 20, so that it constitutes in effect a shutter which completely hides the numerals on the drums. The aforenoted structure is described and claimed in the aforenoted U.S. application Serial No. 389,390.

*Improved features*

In the arrangement heretofore described of the U.S. application Serial No. 389,390, the synchro transmitter electrically connected to the synchro receiver provides a zero torque at the synchro receiver, when the two synchros are at the synchronous position. The torque in the receiver goes up as the displacement increases until it reaches a maximum at 90° then decreases to 180° and is zero at 180°. However, at 180° the system is unstable and usually a small error will cause the receiver to "snap" into position 180° from the correct position.

When the synchro transmitter is coupled to a device that measures in an analogue fashion all angles, the possibilities that the synchro transmitter and the synchro receiver indicator will be so displaced from the synchronous position upon the application of electrical power is remote and in any event within a short time the angle sensed at the synchro transmitter will change sufficiently relative to the synchro receiver to snap the indicator into the correct position.

However, when the synchro transmitter is driven by a device such as a counter or computer as in the case of the hundreds drum of the indicator system herein described, the transmitter synchro may be in a finite number of discrete positions and the possibility of the synchro transmitter and the syncho receiver being displaced 180° from the synchronous position upon the application of electrical power is very probable. In this type of system it will usually be a relatively long time before the synchro transmitter for the hundreds drum will be rotated to a new step to correct such error and therefore such error may remain for a long time.

In order to avoid such erroneous displacement of the synchro receiver 58, there is provided a counterweight element 100 mounted on a pin 102 projecting from within the hundreds drum 40 and so arranged that the synchro receiver 58 will be displaced from a synchronous position relative to the syncho transmitter 43 so as to avoid a zero torque position. The indicator will be so calibrated and the numbers 1, 2 and 3 so positioned on the hundreds drum 40 relative to the counterweight 100 as to compensate for a displacement by the counterweight of the receiver synchro to one side of the zero torque or null position. Thus, a torque will be continuously applied to the receiver synchro 58 although the indicator number 1, 2 or 3 on the drum 40 may be adjacent a viewing window 105 of the indicator 37, as shown schematically in FIGURE 2, in synchronous relation with a corresponding numeral 1, 2 or 3 of the transmitter drum 15.

The invention is broadly concerned with the null position of a synchro receiver shaft driven directly or through a gear train, and is particularly directed to a novel means and arrangement for displacing the null position of a synchro receiver shaft from the zero torque position.

In order to displace the synchro receiver 58 from the normal null position, a calculated weight 100 is placed on the drum 40 at a position 225° in a clockwise direction from a second position 106 on the drum 40 which position 106 corresponds to that position which the drum 40 would take relative to the viewing window 105 in the normal null position of the synchro receiver 58 upon the transmitter synchro 43 and indicator drum 15 being in the positions of FIGURE 1.

The weight of the element 100 is so calculated as to displace the synchro receiver 58 and drum 40 a predetermined extent of, for example, 5° from the normal null position of the synchro receiver 58 so that there is applied a continuous torque to the synchro receiver 58 by the synchro transmitter 43 in opposition to the biasing force of the weighted element 100 acting on the indicator drum 40 until the biasing force of the weighted element 100 is counterbalanced by the torque of the receiver synchro 58 at a predetermined displaced position of the drum 40 at, for example, 5° from the normal null position.

Figure 2:
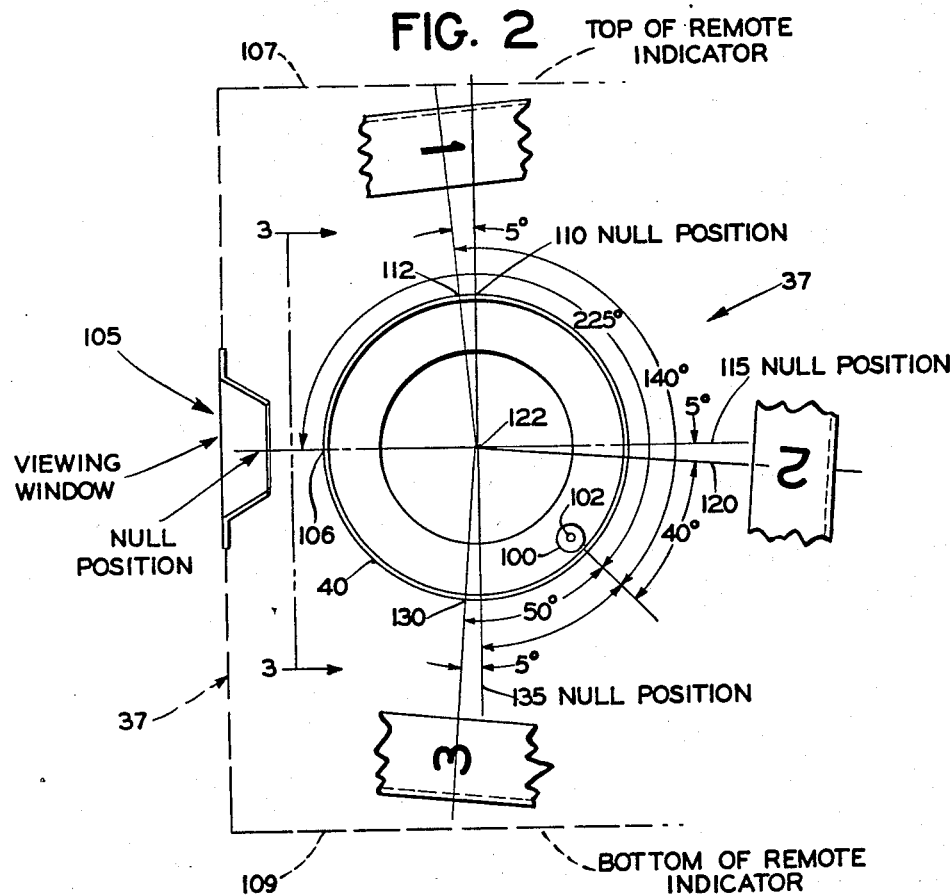
FIGURE 2 is an end view of the hundreds rotor drum of the receiver and illustrating the arrangement of the counterweight and the arrangement of the indicator numerals in relation thereto so as to compensate for the error introduced by the counterweight.
Figure 3:
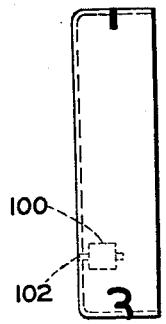
FIGURE 3 is a side view of the hundreds rotor drum of FIGURE 2 illustrating the indicator numerals and the counterweight.

As shown in the drawing of FIGURE 2, the indicator 37 has a top position 107 and a bottom portion 109 and the indicator numeral 1 is placed at a calculated position 112 on the drum 40 leading by 5° a position 110. The latter position 110 is such as to coincide with the window 105 at a predetermined null or zero torque position for the receiver synchro 58 when the transmitter synchro 43 is adjusted so as to reflect the numeral 1 indicator position for the main indicator 12.

Thus, upon the transmitter synchro 43 being rotated on adjustment of the hundreds drum 15 of the main indicator 12 to a numeral 1 indicator position, the resulting torque applied through the receiver synchro 58 effects a rotation of the hundreds drum 40 of the remote indicator 37 in a counterclockwise direction from that shown in FIGURE 2, so as to rotatably position the drum 40 relative to the viewing window 105 and the numeral 1 thereon to a numeral 1 indicator position adjacent the viewing window 105. In the last-mentioned position of the drum 40, the counterweight 100 biases the drum 40 in a clockwise direction in opposition to the torque applied by the receiver synchro 58 so that such position of the indicator numeral 1 in coincidence with the position of the window 105 is in effect leading by 5° the position 110 on the drum 40 corresponding to the null or zero torque position of the receiver synchro 58.

The counterweight 100 in the numeral 1 indicator position of drum 40 tends to retard further adjustment of the receiver synchro 58 to the null or zero torque position so that the receiver synchro 58 applies a continuous torque in opposition to the biasing force of the counterweight 100. Thus, the drum 40 is held in its adjusted numeral 1 indicator position by the opposing biasing forces of the receiver synchro 58 and the counterweight 100 so long as the main indicator drum 15 remains at the controlling numeral 1 position.

Furthermore, the indicator numeral 2 is placed at a calculated position 120 on the drum 40 which when in coincidence with the viewing window 105 would lag by 5° a position 115. The position 115 coincides with the window 105 at a predetermined null or zero torque position for the receiver synchro 58 when the transmitter synchro 43 is adjusted so as to reflect the numeral 2 indicator position at the main indicator 12.

Upon the transmitter synchro 43 being rotated on adjustment of the hundreds drum 15 of the main indicator 12 from a numeral 1 indicator position to a numeral 2 indicator position, the resulting torque applied through the receiver synchro 58 effects a rotation of the hundreds drum 40 of the remote indicator 37 in a counterclockwise direction and in opposition to the force of the counterweight 100 so as to rotatably position the drum 40 relative to the viewing window 105 until the weight 100 passes above the center point 122 of the drum 40 whereupon the weight 100 assists the torque of the receiver synchro 58 in biasing the drum 40 in the counterclockwise direction until the synchro 58 is adjusted past its null or zero torque position.

Upon exceeding the null or zero torque position the receiver synchro 58 asserts a torque of increasing intensity in an opposite or clockwise direction as the adjustment of the receiver synchro 58 exceeds the null position thereof and a torque tending to oppose the biasing force of the counterweight 100 acting in a counterclockwise direction until the force of the one balances the force of the other at which position of the drum 40 the indicator numeral 2 at the calculated position 120 will be in coincidence with the position of the window 105 and in effect lag by 5° the position 115 on the drum 40 corresponding to the null or zero torque position of the receiver synchro 58.

The counterweight 100 in the numeral 2 indicator position of drum 40 tends to retard further adjustment of the receiver synchro 58 to the null or zero torque position so that the receiver synchro 58 applies a continuous torque in a clockwise direction in opposition to the counterclockwise biasing force of the counterweight 100. Thus, the drum 40 is held in its adjusted numeral 2 indicator position by the opposing biasing forces of the receiver synchro 58 and the counterweight 100 so long as the main indicator drum 15 remains at the controlling numeral 2 position.

Similarly, the indicator numeral 3 is placed at a calculated position 130 on the drum 40 which when in coincidence with the viewing window 105 would lag by 5° a position 135. The position 135 coincides with the window 105 at a predetermined null or zero torque position for the receiver synchro 58 when the transmitter synchro 43 is adjusted so as to reflect the numeral 3 indicator position for the main indicator 12.

Upon the transmitter synchro 43 being rotated on adjustment of the hundreds drum 15 of the main indicator 12 from a numeral 2 indicator position to a numeral 3 indicator position, the resulting torque applied through the receiver synchro 58 effects a rotation of the hundreds drum 40 of the remote indicator 37 in a counterclockwise direction assisted by the force of the counterweight 100 so as to rotatably position the drum 40 relative to the viewing window 105 until the synchro 58 is adjusted past its null or zero torque position.

Upon exceeding the null or zero torque position the receiver synchro 58 asserts a torque of increasing intensity in an opposite or clockwise direction as the adjustment of the receiver synchro 58 exceeds the null position thereof and a torque tending to oppose the biasing force of the counterweight 100 acting in a counterclockwise direction until the force of the one balances the force of the other at which position of the drum 40 the indicator numeral 3 at the calculated position 130 will be in coincidence with the position of the window 105 and in effect lag by 5° the position 135 on the drum 40 corresponding to the null or zero torque position of the receiver synchro 58.

The counterweight 100 in the numeral 3 indicator position of drum 40 tends to retard further adjustment of the receiver 58 to the null or zero torque position so that the receiver synchro 58 applies a continuous torque in a clockwise direction in opposition to the counterclockwise biasing force of the counterweight 100. Thus, the drum 40 is held in its adjusted numeral 3 indicator position by the opposing biasing forces of the receiver synchro 58 and the counterweight 100 so long as the main indicator drum 15 remains at the controlling numeral 3 position.

Thus, the indicator numerals 1, 2 and 3 are so placed on the hundreds drum 40 as to correct for the displacement of the drum 40 effected by the counterweight element 100. Moreover, the arrangement is such that the numerals 1, 2 and 3 on the hundreds drum 40 of the receiver synchro 58 are brought into synchronous relation with the transmitter numerals 1, 2 and 3, although due to the arrangement of the weighted element 100 the receiver synchro 58 is in an out of balance relation with the transmitter synchro 43 and a continuous torque is applied by the receiver synchro 58 in such synchronous relation.

Moreover, upon the electrical power to the system being discontinued the weighted element 100 will bias the drum 40, as shown in FIGURE 2, in a clockwise or counterclockwise direction as the case may be until the element 100 rests at a position adjacent the bottom of the indicator and a position not within the unstable zero torque range.

Accordingly, upon the electrical power being reapplied the synchro receiver 58 being initially biased by the weight 100 to the aforenoted unbalanced position relative to the synchro transmitter 43 may be readily driven to a position in synchronous indicator relation to the main indicator 12 without the aforementioned objectionable instability.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In an electrical indicator control system of a type including a main drum counter having a plurality of digit drums, a series of signal transmitter synchros each corresponding to a main digit drum, means for rotating each synchro in a synchronized relation with the corresponding digit drum, a remote drum counter having a plurality of digit drums corresponding to the main counter drums, a series of signal receiver synchros, each receiver synchro corresponding to a remote digit drum, electrical signal conveying means for operably connecting each of said signal transmitter synchros in cooperative relation with a corresponding signal receiver synchro, means for drivingly connecting each of said signal receiver synchros to a corresponding remote digit drum to angularly position said drum; the improvement comprising at least one of said remote digit drums including a weight to angularly bias said one remote digit drum about an axis of rotation thereof in clockwise and counterclockwise directions dependent upon the angular position of said one drum, and the weight thereby biasing the corresponding signal receiver synchro to a position slightly to one side of a predetermined null position relative to the cooperating signal transmitting synchro, and the receiver synchro in the last-mentioned biased position effective to apply a torque to the corresponding digit drum in opposition to the biasing force of the weight as angularly applied to the drum in either said clockwise or counterclockwise direction to assure stability of control of the position of the receiver synchro.

2. In an electrical indicator control system of a type including a main drum counter having a plurality of digit drums, a series of signal transmitter synchros each corresponding to a main digit drum, means for rotating each synchro in a synchronized relation with the corresponding digit drum, a remote drum counter having a plurality of digit drums corresponding to the main counter drums, a series of signal receiver synchros, each receiver synchro corresponding to a remote digit drum, electrical signal conveying means for operably connecting each of said signal transmitter synchros in cooperative relation with a corresponding signal receiver synchro, means for drivingly connecting each of said signal receiver synchros to a corresponding remote digit drum; the improvement comprising at least one of said remote digit drums including a weight element effective to bias said one remote digit drum and thereby the corresponding signal receiver synchro in a sense to shift the receiver synchro to a position slightly to one side of a predetermined null position relative to the cooperative signal transmitting synchro upon an adjustment of said signal transmitting synchro to a first position, and said weight element effective to bias said one remote digit drum and thereby the corresponding signal receiver synchro in an opposite sense to shift the receiver synchro to a position slightly to another side of a predetermined null position relative to the cooperative signal transmitting synchro upon an adjustment of said signal transmitting synchro to a second position, and the receiver synchro effective in the first and second-mentioned biased positions to apply a torque in a sense opposing the biasing force of the weight element to assure stability of control of the position of the receiver synchro.

3. For use in an electrical indicator control system of a type including a drum counter means having a frame, a drum rotatably mounted in the frame, said drum having an end wall and an annular wall surface bearing indicia, and driving means to bring said indicia selectively into a viewing position including a synchro having a stator and a rotor, the rotor being rotatable relative to the stator to a first position and to a second position upon a signal voltage in a predetermined sense being selectively applied to the synchro, and said rotor being drivingly connected to the drum; the improvement comprising a pin projecting within the drum from the end wall thereof, a weighted element mounted on the pin and so arranged as to bias the drum and thereby the rotor of the synchro in one sense from a zero torque position relative to the stator of the synchro upon the synchro effecting the rotation of the rotor to the first position and in an opposite sense upon the synchro effecting the rotation of the rotor to the second position to thereby effect the selective adjustment of the drum indicia into the viewing position so that in the selected position of the indicia the synchro applies a torque in opposition to the bias of the weighted element to assure stability of control of the position of the rotor.

References Cited in the file of this patent

UNITED STATES PATENTS

| | | |
|---|---|---|
| 1,868,523 | Florez | July 26, 1932 |
| 1,919,493 | Zubaty | July 25, 1933 |
| 2,855,587 | Macgeprge | Oct. 7, 1958 |